United States Patent
Yang et al.

(10) Patent No.: US 11,609,936 B2
(45) Date of Patent: Mar. 21, 2023

(54) GRAPH DATA PROCESSING METHOD, DEVICE, AND COMPUTER PROGRAM PRODUCT

(71) Applicant: EMC IP Holding Company LLC, Hopkinton, MA (US)

(72) Inventors: Wenbin Yang, Shanghai (CN); Zijia Wang, WeiFang (CN); Jiacheng Ni, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/406,283

(22) Filed: Aug. 19, 2021

(65) Prior Publication Data

US 2023/0041338 A1 Feb. 9, 2023

(30) Foreign Application Priority Data

Jul. 23, 2021 (CN) .......................... 202110839531.X

(51) Int. Cl.
*G06F 16/28* (2019.01)
*G06N 3/04* (2023.01)
*G06F 16/901* (2019.01)

(52) U.S. Cl.
CPC ........ *G06F 16/285* (2019.01); *G06F 16/9024* (2019.01); *G06N 3/04* (2013.01)

(58) Field of Classification Search
CPC .. G06F 16/285; G06F 16/9024; G06F 16/288; G06F 16/906; G06N 3/04;

(Continued)

(56) References Cited

U.S. PATENT DOCUMENTS

2020/0104729 A1* 4/2020 Busbridge .............. G06N 3/082
2020/0285944 A1* 9/2020 Lee ...................... G06N 3/0472

(Continued)

OTHER PUBLICATIONS

L. Sun et al., "Understanding Urban Mobility Patterns with a Probabilistic Tensor Factorization Framework," Journal of Transportation Research Part B Methodological, Jun. 2016, 16 pages.

(Continued)

*Primary Examiner* — Evan Aspinwall
(74) *Attorney, Agent, or Firm* — Ryan, Mason & Lewis, LLP

(57) ABSTRACT

A method for graph data processing comprises obtaining graph data which includes a plurality of nodes and data corresponding to the plurality of nodes respectively; classifying the plurality of nodes into at least one category of a plurality of categories, wherein the plurality of categories are associated with a plurality of node relationship patterns; determining, from a plurality of candidate parameter value sets of a graph convolutional network (GCN) model, parameter value subsets respectively matching at least one category, wherein the plurality of candidate parameter value sets are determined by training the GCN model respectively for the plurality of node relationship patterns; and using the parameter value subsets respectively matching the at least one category to respectively perform a graph convolution operation in the GCN model on data corresponding to the nodes classified into the at least one category to obtain a processing result for the graph data.

20 Claims, 4 Drawing Sheets

(58) Field of Classification Search
CPC ............ G06N 20/00; G06N 3/08; G06N 5/02; G06N 3/0427; G06N 5/022
USPC .................................. 707/737, 776; 706/20
See application file for complete search history.

(56) References Cited

U.S. PATENT DOCUMENTS

2020/0337648 A1* 10/2020 Saripalli ............... G16H 10/00
2022/0171936 A1* 6/2022 Wang .................... G06F 40/237
2022/0237222 A1* 7/2022 Liu ......................... G06F 16/45

OTHER PUBLICATIONS

T. N. Kipf et al., "Semi-Supervised Classification with Graph Convolutional Networks," arXiv:1609.02907v4, Feb. 22, 2017, 14 pages.
A. Schein et al., "Bayesian Poisson Tensor Factorization for Inferring Multilateral Relations from Sparse Dyadic Event Counts," arXiv:1506.03493v1, Jun. 10, 2015, 10 pages.
Z. Zhang et al., "Network-wide Traffic Flow Estimation with Insufficient Volume Detection and Crowdsourcing Data," Journal of Transportation Research Part C: Emerging Technologies, Dec. 2012, 16 pages.

* cited by examiner

GRAPH DATA PROCESSING METHOD, DEVICE, AND COMPUTER PROGRAM PRODUCT

RELATED APPLICATION(S)

The present application claims priority to Chinese Patent Application No. 202110839531.X, filed Jul. 23, 2021, and entitled "Graph Data Processing Method, Device, and Computer Program Product," which is incorporated by reference herein in its entirety.

FIELD

The present disclosure generally relates to the technical field of computers, and in particular, to a method, a device, and a computer program product for graph data processing.

BACKGROUND

Currently, deep learning involves various types of models, and some common models include Convolutional Neural Networks (CNNs), Recurrent Neural Networks (RNNs), and the like. CNN mainly performs convolution processing on two-dimensional data to extract features, and RNN is mainly designed for, for example, one-dimensional sequence information of natural languages. However, for infinite-dimensional and irregular graph data structures, CNN and RNN cannot effectively implement data processing, and thus a method of Graph Convolutional Network (GCN) is proposed to extract features from graph data.

SUMMARY

According to some embodiments of the present disclosure, a graph data processing solution is provided.

In a first aspect of the present disclosure, a method for graph data processing is provided. This method includes: obtaining graph data which includes a plurality of nodes and data corresponding to the plurality of nodes respectively; classifying the plurality of nodes into at least one category of a plurality of categories, wherein the plurality of categories are associated with a plurality of node relationship patterns; determining, from a plurality of candidate parameter value sets of a graph convolutional network (GCN) model, parameter value subsets respectively matching at least one category, wherein the plurality of candidate parameter value sets are determined by training the GCN model respectively for the plurality of node relationship patterns; and using the parameter value subsets respectively matching the at least one category to respectively perform a graph convolution operation in the GCN model on data corresponding to the nodes classified into the at least one category to obtain a processing result for the graph data.

In a second aspect of the present disclosure, an electronic device is provided, which includes: at least one processing unit; and at least one memory coupled to the at least one processing unit and storing instructions for execution by the at least one processing unit, wherein the instructions, when executed by the at least one processing unit, cause the device to perform actions. The actions include: obtaining graph data which includes a plurality of nodes and data corresponding to the plurality of nodes respectively; classifying the plurality of nodes into at least one category of a plurality of categories, wherein the plurality of categories are associated with a plurality of node relationship patterns; determining, from a plurality of candidate parameter value sets of a graph convolutional network (GCN) model, parameter value subsets respectively matching at least one category, wherein the plurality of candidate parameter value sets are determined by training the GCN model respectively for the plurality of node relationship patterns; and using the parameter value subsets respectively matching the at least one category to respectively perform a graph convolution operation in the GCN model on data corresponding to the nodes classified into the at least one category to obtain a processing result for the graph data.

In a third aspect of the present disclosure, a computer program product is provided, which is tangibly stored on a non-volatile computer-readable medium and includes computer-executable instructions, wherein the computer-executable instructions, when executed, cause a device to perform actions. The actions include: obtaining graph data which includes a plurality of nodes and data corresponding to the plurality of nodes respectively; classifying the plurality of nodes into at least one category of a plurality of categories, wherein the plurality of categories are associated with a plurality of node relationship patterns; determining, from a plurality of candidate parameter value sets of a graph convolutional network (GCN) model, parameter value subsets respectively matching at least one category, wherein the plurality of candidate parameter value sets are determined by training the GCN model respectively for the plurality of node relationship patterns; and using the parameter value subsets respectively matching the at least one category to respectively perform a graph convolution operation in the GCN model on data corresponding to the nodes classified into the at least one category to obtain a processing result for the graph data.

According to various embodiments of the present disclosure, various nodes in the graph data are classified by patterns, and for different node relationship patterns, different parameter values are selected to respectively perform a graph convolution operation in the GCN model on data corresponding to the nodes in the graph data. In this way, it is possible to realize feature extraction of the graph data in a deeper level, so that the obtained processing result is more accurate.

BRIEF DESCRIPTION OF THE DRAWINGS

The above and other objectives, features, and advantages of the embodiments of the present disclosure will become easily understandable by reading the following detailed description with reference to the accompanying drawings. In the accompanying drawings, several embodiments of the present disclosure are shown by way of example instead of limitation, wherein.

DETAILED DESCRIPTION

Figure 1:
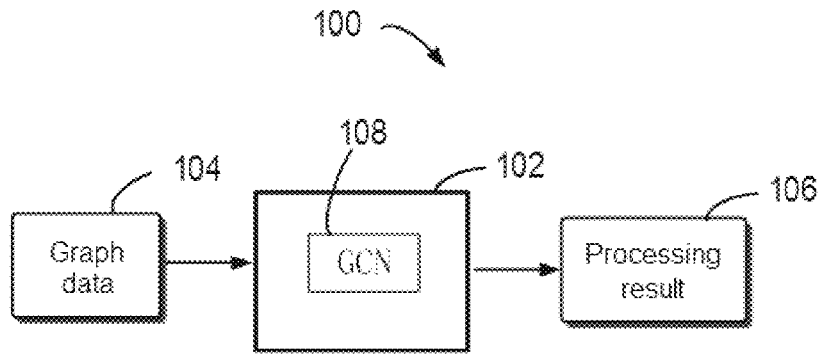
FIG. 1 shows an example environment for graph data processing in which embodiments of the present disclosure can be implemented.

Illustrative embodiments of the present disclosure will be described in more detail below with reference to the accompanying drawings. Although illustrative embodiments of the present disclosure are illustrated in the accompanying drawings, it should be understood that the present disclosure may be implemented in various forms and should not be limited by the embodiments illustrated herein. Instead, these embodiments are provided in order to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," and the like may refer to different or identical objects. Other explicit and implicit definitions may also be included below.

As used herein, the term "model" can learn a correlation between corresponding inputs and outputs from training data, so that a corresponding output can be generated for a given input after the training is completed. The generation of a model can be based on machine learning technologies. Deep learning is a machine learning algorithm that uses multiple layers of processing units to process inputs and provide corresponding outputs. The neural network model is an example of a model based on deep learning. Herein, "model" may also be referred to as "machine learning model," "learning model," "machine learning network," or "learning network," and these terms are used interchangeably herein.

Usually, machine learning may include three stages, namely, a training stage, a testing stage, and a using stage (also referred to as a reasoning stage). In the training stage, a given model may be trained using a large amount of training data, and iteration is continuously made until the model can obtain, from the training data, consistent inferences similar to inferences that can be made by human intelligence. Through training, the model can be considered to be able to learn the correlation from inputs to outputs (also referred to as mapping from inputs to outputs) from the training data. The model may be represented as a function for mapping inputs to outputs. Parameter values of the trained model are determined. In the testing stage, test inputs are applied to the trained model to test whether the model can provide correct outputs, thereby determining the performance of the model. In the use stage, the model may be used to process an actual input based on the parameter values obtained by training and determine a corresponding output.

Herein, graph data or a graph refers to an abstract data type, which includes a plurality of nodes and data corresponding to the plurality of nodes. Each node can represent an object (also referred to as an entity). In the graph data, there are edges, which are connected to each other, between the plurality of nodes, to indicate the relationships between the plurality of objects.

Currently, in a graph data processing method based on a GCN model, a node embedded in a given graph structure for the graph data learns from features of neighboring nodes in the vicinity of the node. Through learning, the GCN model can capture relationship patterns between a plurality of nodes in the graph data, thereby better characterizing features of each node. In some cases, in order to operate more accurately with pieces of feature information of neighboring nodes, attention scores learned by a multi-head self-attention mechanism are used to weight the pieces of feature information from different neighboring nodes.

However, in an existing GCN model-based graph data processing method, for all nodes in the graph data, the same weighted parameter value set is trained and used, which does not take into account the problem that different parts of the graph data have different relationship patterns, which leads to "over-smoothing" in graph data processing, and also limits the application in larger graph data processing.

In order to at least solve the above problems, according to an embodiment of the present disclosure, an improved solution for graph data processing is provided. In this solution, a plurality of nodes in the graph data are classified by categories. Parameter value subsets matching the categories are determined from a plurality of candidate parameter value sets of the GCN model. Using the parameter value subsets matching the categories, graph convolution operations in the GCN model are performed on nodes classified into different categories, respectively. With this solution, it is possible to discover potential node relationship patterns in the graph data, and to select, for nodes under different node relationship patterns, parameter value sets suitable for said patterns, respectively. In this way, a deeper-level node relationship is taken into account, thus avoiding "over-smoothing" in the graph data processing, so that a processing result of the graph data contains deeper-level (high-order) feature information and has a higher accuracy.

FIG. 1 shows an example environment for graph data processing in which embodiments of the present disclosure can be implemented. As shown in FIG. 1, example environment 100 includes computing device 102 for extracting feature information according to graph data 104 and obtaining processing result 106 based on the feature information.

As an example, graph data 104 may include data constructed based on traffic flow data. In this example, a plurality of nodes in graph data 104 may include locations in actual traffic, and data corresponding to each node includes the number of vehicles entering a corresponding location and/or the number of vehicles leaving a certain location in one or more time periods. GCN model 108 may be modeled to process graph data 104 to obtain processing result 106 for graph data 104. Depending on a specific configuration of GCN model 108 constructed under different applications, processing result 106 may indicate expected results in different aspects, including but not limited to prediction information related to each node in graph data 104, and/or relationship information between various nodes. For example, in an example of traffic flow prediction, processing result 106 may indicate that the number of vehicles entering/leaving location A is close to the number of vehicles entering/leaving location B. In some subsequent tasks, the output relationship information may be used to realize the traffic flow prediction, for example, the number of vehicles entering/leaving location A in a certain period of time may be used to predict the number of vehicles entering/leaving location B in the same period of time.

It should be understood that the structure of graph data 104 shown in FIG. 1 is merely an example without any limitation. It should also be understood that graph data 104 is not limited to the above traffic flow data, but it may represent any data that may be described using a graph structure. Also, processing result 106 is not limited to being used for prediction, but may also be used for node classification, graph classification, etc., and it is also possible to obtain an embedded representation of the graph and the like.

Computing device 102 may be any device with computing capabilities. For example, computing device 102 may be a centralized server, a distributed server, a mainframe, an edge computing device, a cloud, or the like. For example, computing device 102 may also be a portable or fixed terminal device, including an IoT device, a tablet computer, a desktop computer, a notebook computer, a mobile phone, a general-purpose computing device, and the like. However, only some examples of computing devices are given above, and the graph data processing may be implemented by any type of computing device or devices.

With the example environment of FIG. 1, the graph data processing method of the present disclosure may take into account a deeper-level node relationship pattern, thus avoiding "over-smoothing" in the graph data processing, so that a processing result of the graph data contains deeper-level (high-order) feature information and has a higher accuracy.

Figure 2:
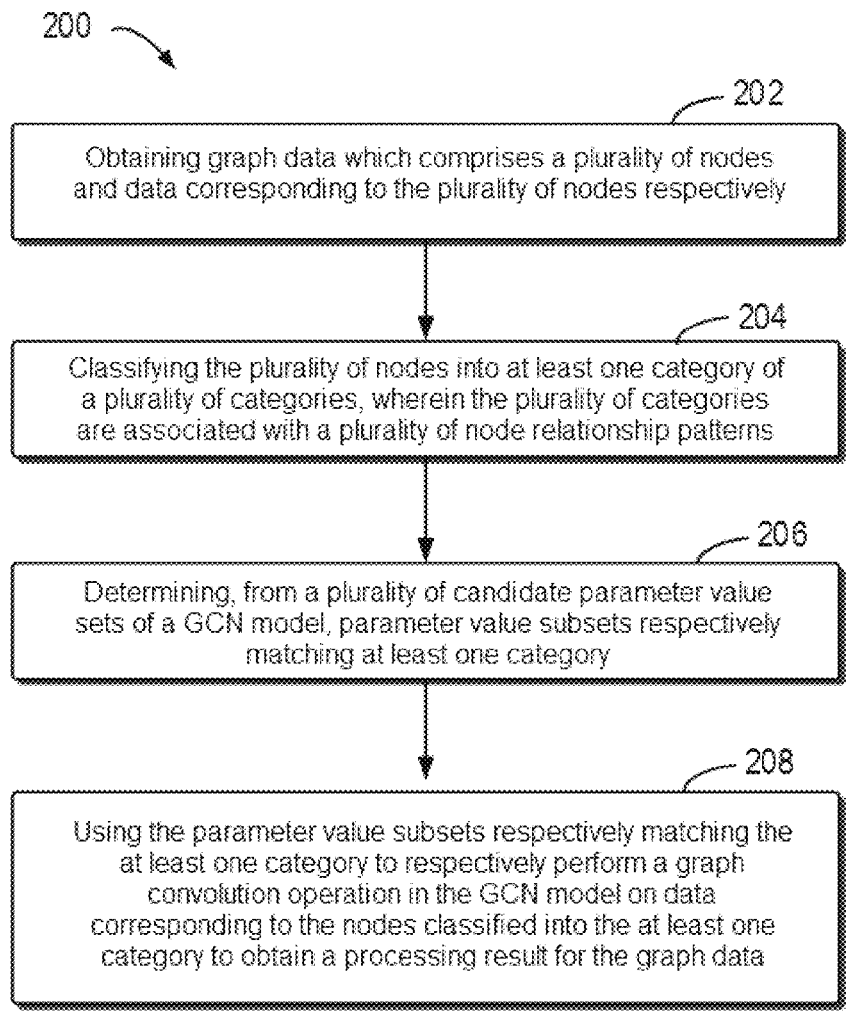
FIG. 2 shows a flow chart of a method for graph data processing according to some embodiments of the present disclosure.

FIG. 1 above shows a schematic diagram of environment 100 in which a plurality of embodiments of the present disclosure can be implemented. Detailed description is given below in conjunction with FIG. 2. FIG. 2 shows a flow chart of a method for graph data processing according to some embodiments of the present disclosure. Method 200 in FIG. 2 may be performed by computing device 102 in FIG. 1 or any suitable computing device. To facilitate discussion, method 200 will be described with reference to the environment of FIG. 1.

At block 202, computing device 102 obtains graph data. The graph data includes a plurality of nodes and data corresponding to the plurality of nodes respectively. For example, graph data 104 may include node 1 to node n. Data corresponding to node 1 is data 1, data corresponding to node n is data n, and so on. Herein, graph data 104 may be represented by a matrix X consisting of N vectors corresponding to N nodes, the matrix X includes a vector $x_n$ representing each node of the plurality of nodes (where N represents any positive integer corresponding to the node), and the vector $x_n$ represents data corresponding to node n.

At block 204, computing device 102 classifies a plurality of nodes into at least one category of a plurality of categories. In an embodiment of the present disclosure, a plurality of categories are preset, and these categories are respectively associated with a plurality of node relationship patterns. For example, the plurality of categories may be set as category A, category B, category C, category D, and category E, wherein category A, category B, category C, category D, and category E respectively correspond, one to one, to a first node relationship pattern, a second node relationship pattern, a third node relationship pattern, a fourth node relationship pattern, and a fifth node relationship pattern. The nodes in graph data 104 may be classified into different categories according to the node relationship patterns. For example, node 1 to node 4 may be classified into category A. Correspondingly, node 1 to node 4 belong to the first node relationship pattern. Node 5 to node 10 are classified into category C. Correspondingly, node 5 to node 10 belong to the second node relationship pattern. Other categories may have no corresponding nodes. The classification of nodes will be discussed in more detail below.

At block 206, computing device 102 determines, from a plurality of candidate parameter value sets of the GCN model, parameter value subsets respectively matching the at least one category. The plurality of candidate parameter value sets are determined by training the GCN model respectively for the plurality of node relationship patterns.

For example, the plurality of candidate parameter value sets (which may also be referred to as the plurality of candidate weighted value sets) of the GCN model includes candidate parameter value sets W1, W2, W3, W4, and W5, wherein there is an association relationship between the candidate parameter values and the node relationship patterns. For example, candidate parameter value set W1 is determined by training the GCN model for the first node relationship pattern, candidate parameter value set W2 is determined by training the GCN model for the second node relationship pattern, and so on. As such, different candidate parameter value sets may be particularly suitable for processing graph data having different node relationship patterns. According to the solution of the present disclosure, the parameter value sets are respectively trained for different node relationship patterns, and by doing this, an obtained parameter value set corresponding to the same node relationship pattern is more suitable as a weight parameter of this node relationship pattern, so as to extract feature information more accurately.

In some embodiments, when a parameter value subset respectively matching at least one category is determined, it is possible to determine, based on the association relationship between the plurality of node relationship patterns and the plurality of candidate parameter value sets, a matching candidate parameter value set for each category in the at least one category from the plurality of candidate parameter value sets. In one example, based on the above association relationship between the node relationship patterns and the candidate parameter values, a matching candidate parameter value set W1 for category A is determined from the plurality of candidate parameter value sets, and a matching candidate parameter value set W3 for category C is determined from the plurality of candidate parameter value sets.

For each category in the at least one category, it is possible to determine, based on a matching candidate parameter value set for this category and nodes classified into this category, a parameter value subset corresponding to this category from the matching candidate parameter value set. The parameter value subset refers to parameter values in the matching candidate parameter value set that can be used to process data of nodes in a corresponding category. In one example, for category A, parameter value subset W1' corresponding to category A is determined from matching candidate parameter value set W1 based on matching candidate parameter value set W1 and node 1 to node 4 classified into category A. Parameter value subset W1' includes a parameter value, for processing data corresponding to node 1 to node 4, in matching candidate parameter value set W1. Similarly for category C, parameter value subset W3' corresponding thereto may also be determined, which will not be repeated here.

At block 208, computing device 102 uses the parameter value subsets respectively matching the at least one category to respectively perform a graph convolution operation in the GCN model on data corresponding to the nodes classified into the at least one category to obtain a processing result for the graph data. For example, using parameter value subset W1' that matches category A, a graph convolution operation in the GCN model is performed on data 1 to data 4 corresponding to node 1 to node 4 classified into category A, and by using parameter value subset W3' that matches category C, a graph convolution operation in the GCN model is performed on data 5 to data 10 corresponding to node 5 to node 10 classified into category C, thereby obtaining a processing result (e.g., processing result 106) for the graph data X.

Through the method of the above embodiments, classification of node relationship patterns is performed on the plurality of nodes in the graph data, such that nodes with a high degree of association belong to the same node relationship pattern. This may discover potential node relationship patterns in the graph data, and select, for nodes under different node relationship patterns, parameter value sets suitable for said patterns, respectively, which takes into account a deeper-level node relationship, thus avoiding "over-smoothing" in the graph data processing, so that a processing result of the graph data contains deeper-level (high-order) feature information and has a higher accuracy.

In one example, the processing in the GCN model according to some embodiments of the present disclosure may be represented as:

$$Y = \left(I_N + D^{-\frac{1}{2}} A D^{-\frac{1}{2}}\right) X \left[G(X, \mu) \times_2^2 \mathcal{W}\right] \quad (1)$$

where $X \in \mathbb{R}^{N \times F}$ is an input matrix (a mathematical representation of graph data 104, wherein the input matrix includes N nodes, and F represents the size of each node) of the GCN model, $I_N$ is a unit matrix, $A \in \mathbb{R}^{N \times N}$ is an adjacency matrix of the graph, $D \in \mathbb{R}^{N \times N}$ is a degree matrix, $Y \in \mathbb{R}^{N \times C}$ is an output matrix (a mathematical representation of a processing result of the graph data, wherein C represents the size of an output result for each node) of the GCN model, $\mathcal{W} \in \mathbb{R}^{K \times F \times C}$ is a learnable parameter value tensor (a mathematical representation of a plurality of candidate parameter value sets, which includes K candidate parameter value sets of dimension F×C for K node relationship patterns), function C (X,μ) is a node classification function (this function is to implement the function of block 204, see the detailed description below), and operation $x_2^2$ is an Einstein product used to associate a pattern with a certain node and to implement the function of block 206 by acting on functions G(X,μ) and $\mathcal{W} \in \mathbb{R}^{K \times F \times C}$.

Figure 3:
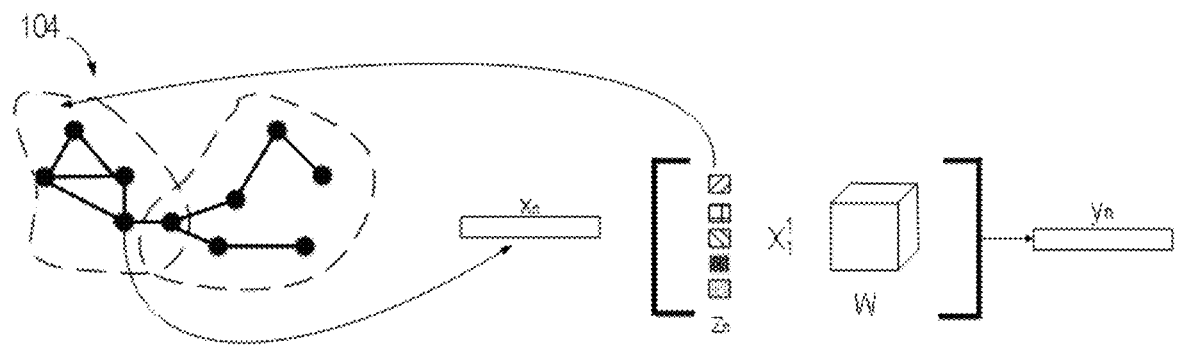
FIG. 3 shows a schematic diagram of graph data processing according to some embodiments of the present disclosure.

The following will be further explained with reference to FIG. 3. FIG. 3 shows a schematic diagram of graph data processing in some embodiments of the present disclosure.

In a calculation process using the above model, as shown in FIG. 3, after the input matrix $X \in \mathbb{R}^{N \times F}$ of graph data 104 is processed via block 204, the nodes in graph data 104 may be classified into category A and category C, wherein category A is associated with the first node relationship pattern, and the category C is associated with the third relationship pattern. The classification result is shown in the figure. Subsequently, the processing of block 206 and block 208 may be performed on each node under different node relationship patterns respectively. For example, for the first node relationship pattern, candidate parameter value set W1∈ $\mathbb{R}^{F \times C}$ matching category A is firstly selected from $\mathcal{W} \in \mathbb{R}^{K \times F \times C}$. Then, W1∈ $\mathbb{R}^{F1 \times C}$ parameter value subset that can realize dimension matching with node set X1∈ $\mathbb{R}^{N \times F1}$ under the first node relationship pattern is determined from W1∈ $\mathbb{R}^{F \times C}$. In this way, node n (e.g., node 4, which can be determined by a score vector $z_4$ in the following description to belong to the first node relationship pattern, see the following description for details) in a plurality of nodes can select a parameter value corresponding to node n, for example, according to category A (associated with the first node relationship pattern) determined via block 204 and through Einstein product $x_1^1$ corresponding to node n, for example. Using the parameter value corresponding to node n, a graph convolution operation in the GCN model is performed on vector $x_n$ of data n corresponding to node n, so as to obtain output result $y_n$. Related technologies may be referred for this graph convolution operation, and the description will not be repeated here to avoid covering up the contents of the present disclosure.

Figure 4:
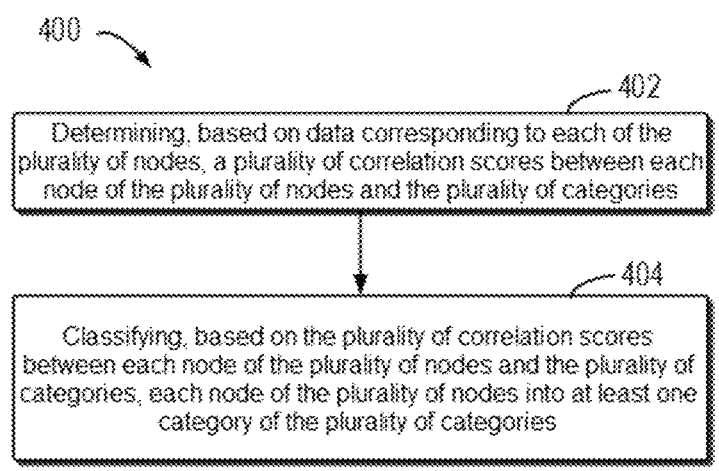
FIG. 4 shows a flow chart of a method for node classification according to some embodiments of the present disclosure.
Figure 5:
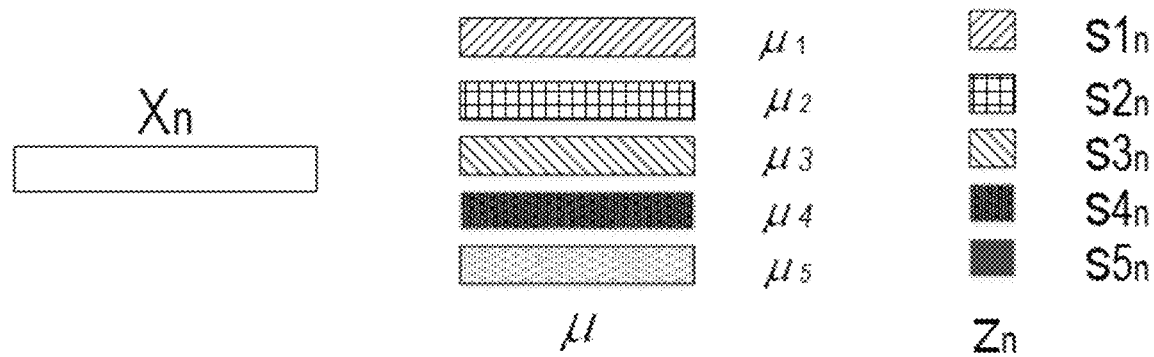
FIG. 5 shows a schematic diagram of node classification according to some embodiments of the present disclosure.

In some embodiments, the function implemented above by block 204 may be implemented by the following embodiments, which are described in detail below with reference to FIG. 4 and FIG. 5. FIG. 4 shows a flow chart of method 400 for node classification in some embodiments of the present disclosure. FIG. 5 shows a schematic diagram of node classification in some embodiments of the present disclosure.

At block 402, based on data corresponding to each of a plurality of nodes, a plurality of correlation scores between each of the plurality of nodes and a plurality of categories are determined.

In some embodiments, when the plurality of correlation scores are determined, a reference parameter value set may be obtained, and a plurality of reference parameter value subsets in the reference parameter value set are associated with a plurality of categories. For example, as shown in FIG. 5, a reference parameter value set mathematically represented by a base matrix u is obtained. This base matrix p includes base vectors $\mu_1$, $\mu_2$, $\mu_3$, $\mu_4$, and $\mu_5$ respectively corresponding to category A, category B, category C, category D, and category E. For each node of the plurality of nodes in graph data 104, a plurality of correlation scores between this node and a plurality of categories are determined based on data corresponding to this node and a plurality of reference parameter value subsets. By using the one-to-one correspondence between the plurality of reference parameter value subsets in the reference parameter value set and the plurality of categories, and by determining the correlation between data corresponding to a node and each reference parameter value subset in the plurality of reference parameter value subsets, the correlation between the node and the plurality of categories may also be determined.

In some embodiments, determining a plurality of correlation scores between this node and the plurality of categories based on the data corresponding to this node and the plurality of reference parameter value subsets may include the following steps: constructing an attention model which takes a reference parameter value set as a model parameter, and applying data corresponding to each node of the plurality of nodes to the attention model to obtain a plurality of correlation scores output by the attention model.

In one example, the processing in the attention model according to some embodiments of the present disclosure may be represented as:

$$Z = \text{softmax}(\tanh (X\mu^T)) \quad (2)$$

where $\mu\mu^T = I_K$, $X \in \mathbb{R}^{N \times F}$ is an input matrix (data corresponding to a plurality of (N) nodes in graph data 104) of classification function softmax, $Z \in \mathbb{R}^{N \times K}$ represents an output matrix of classification function softmax (which also represents an output matrix of the above function G(X,μ), and $\mu \in \mathbb{R}^{K=F}$ is a model parameter representing the attention model, which is an orthogonal base matrix and may be used as a reference parameter value set for K categories. The output matrix $Z \in \mathbb{R}^{N \times K}$ represent K correlation scores between each node of the N nodes and the K categories.

In the attention model of the present disclosure, a classification function is used to process a plurality of reference parameter value subsets and data corresponding to nodes to obtain attention values. Nodes under different relationship patterns may be effectively distinguished based on attention values of typical attention blocks (as the centers of node sets under the same pattern, which are parameter effective), so the attention values can well represent a plurality of correlation scores between nodes and a plurality of categories.

As shown in FIG. 5, for node n (n=1, 2, ..., N) in a plurality of nodes, data n of vector $x_n$ corresponding to node n is applied to the above attention model as a model input. Score vector $z_n$ for node n is calculated using the various base vectors $\mu_1, \mu_2, \mu_3, \mu_4$, and $\mu_5$ in the reference parameter value set of the attention model, and this score vector $z_n$ includes correlation scores $S1_n, S2_n, S3_n, S4_n$, and $S5_n$ corresponding to category A, category B, category C, category D, and category E, respectively. Of course, the number of categories here is merely an example without any limitation.

Returning to FIG. 4, at block 404, each node of the plurality of nodes is classified into at least one category of the plurality of categories based on a plurality of correlation scores between each node of the plurality of nodes and the plurality of categories. For each node, if the correlation score between this node and a category is relatively high, which means that this node is more related to this category, it may be classified into this category.

In some embodiments, the function implemented at block 404 may include the following steps: selecting a correlation score exceeding a score threshold from a plurality of correlation scores determined for each node; and classifying each node into a category of a plurality of categories that corresponds to the selected correlation score. In some examples, the score threshold may be a predetermined expected value. If a certain node has two or more correlation scores that exceed the score threshold, these correlation scores may be selected arbitrarily. In some examples, for each node, a category corresponding to the highest correlation score may be selected.

For example, for node n, correlation scores $S1_n, S2_n, S3_n, S4_n$, and $S5_n$ corresponding to category A, category B, category C, category D, and category E respectively are calculated via block 402. Correlation scores $S1_n, S2_n, S3_n, S4_n$, and $S5_n$ may represent the probabilities that node n respectively belongs to category A, category B, category C, category D, and category E. It is assumed that S1n is equal to 0.1, $S2_n$ is equal to 0.2, $S3_n$ is equal to 0.4, $S4_n$ is equal to 0.15, and $S5_n$ is equal to 0.15. When the score threshold is set to 0.3, it can be seen that only $S3_n$ exceeds 0.3, which means that node n has the closest association with the category corresponding to $S3_n$, so node n is classified into category C corresponding to correlation score $S3_n$.

In order to further evaluate the advantages of the embodiments of the present disclosure, real-world traffic flow data (which is collected by 206 sensors, each of the sensors recording the traffic flow at a specific location and at each time point in a certain period of time, such as the number of vehicles entering/leaving) is used for verification, and the specific settings are as follows:

after the traffic flow data is properly processed, it is used as a node feature corresponding to a node of the graph data;

Euclidean distance is used as the connectivity of a graph; and an adjacency matrix of the graph is constructed in advance.

Figure 6A:
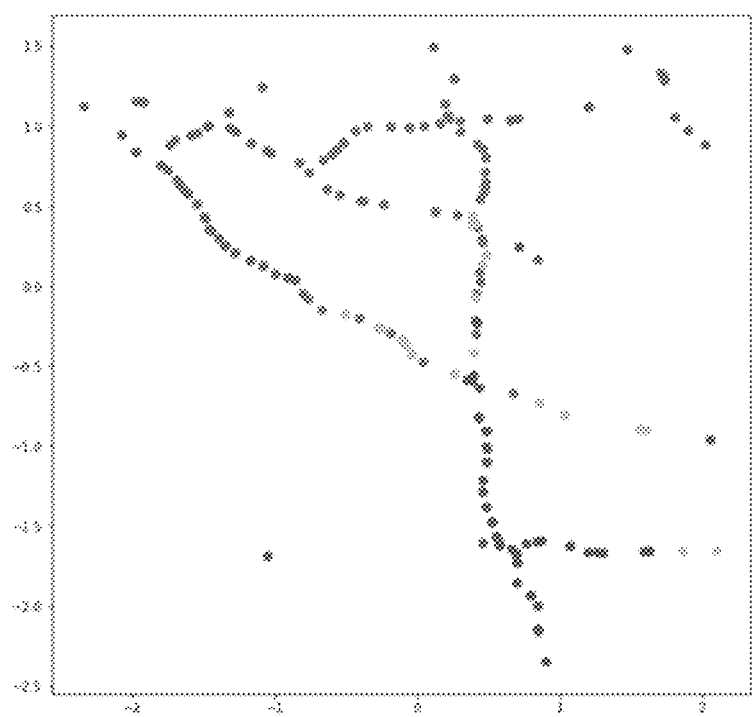
FIG. 6A shows a result diagram of processing real-world data using an embodiment of the present disclosure.
Figure 6B:
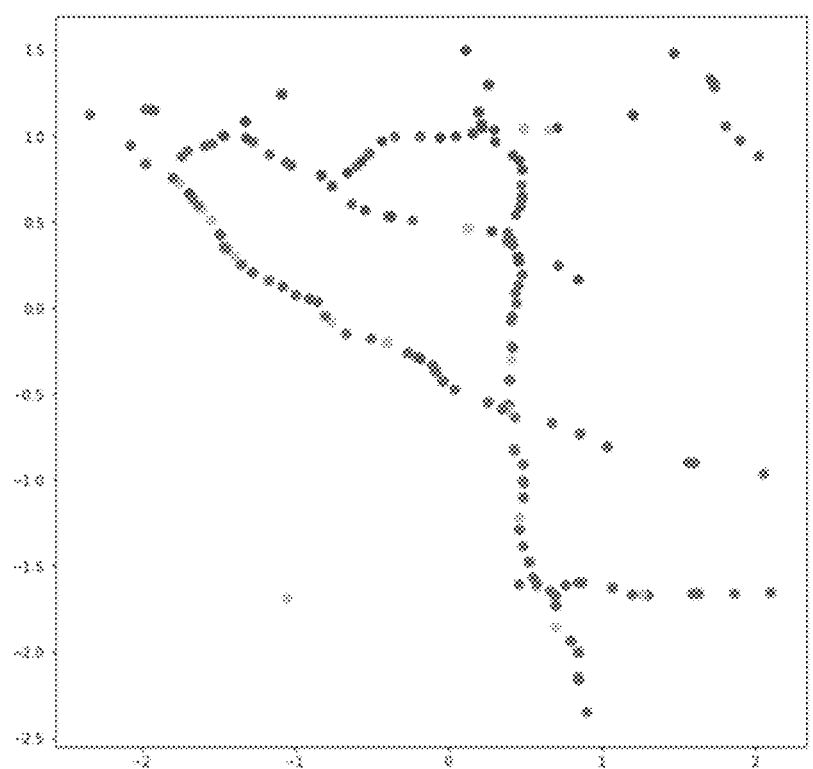
FIG. 6B shows a result diagram of processing real-world data using the prior art.

After the above settings, graph data corresponding to the real-world traffic flow data is obtained, and then the graph data is applied as an input to the model of the embodiment of the present disclosure. Unsupervised training is performed on the graph data, and the result shown in FIG. 6A can be obtained. By comparing FIG. 6A and FIG. 6B (results of an existing matrix factor (MF) method), it can be seen that traffic patterns presented in FIG. 6B are chaotic, while potential traffic patterns can be more accurately found by using the result obtained by the method provided in the present disclosure. These traffic patterns are closely related to a sensor topology, so that based on the result of FIG. 6A, an accurate prediction of subsequent traffic flow can be achieved more favorably.

Figure 7:
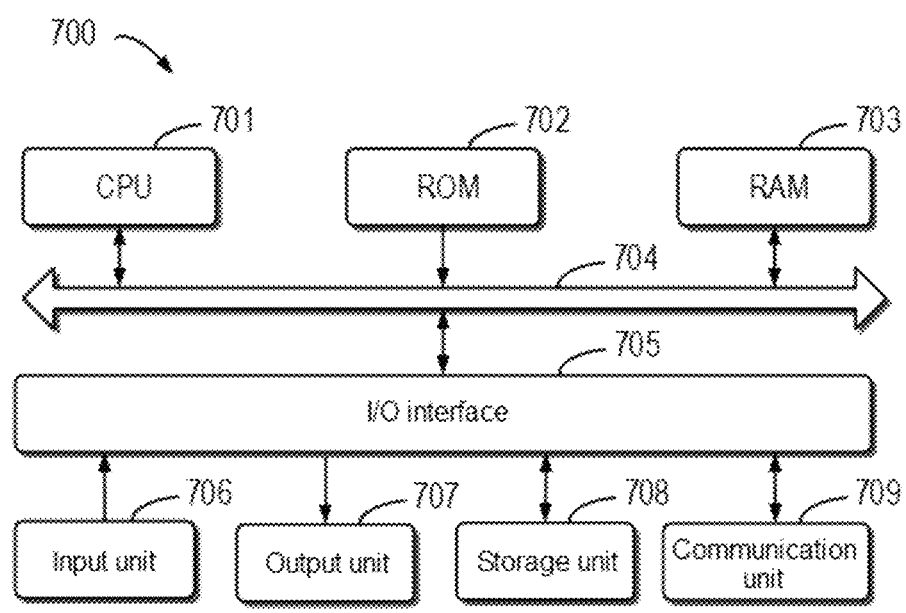
FIG. 7 shows a block diagram of a computing device in which one or more embodiments of the present disclosure may be implemented.

FIG. 7 schematically shows a block diagram of device 700 that can be configured to implement an embodiment of the present disclosure. It should be understood that device 700 shown in FIG. 7 is merely an example and should not constitute any limitation to the function and scope of the embodiments described herein. Device 700 shown in FIG. 7 may be used to implement method 200 of FIG. 2. Device 700 shown in FIG. 7 may be implemented as or included in computing device 102 of FIG. 1.

As shown in FIG. 7, device 700 includes central processing unit (CPU) 701 which may execute various appropriate actions and processing in accordance with computer program instructions stored in read-only memory (ROM) 702 or computer program instructions loaded onto random access memory (RAM) 703 from storage unit 708. Various programs and data required for the operation of device 700 may also be stored in RAM 703. CPU 701, ROM 702, and RAM 703 are connected to one another through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, such as method 200, may be performed by CPU 701. For example, in some embodiments, method 200 may be implemented as a computer software program that is tangibly included in a machine-readable medium, for example, storage unit 708. In some embodiments, part or all of the computer program may be loaded and/or installed to device 700 via ROM 702 and/or communication unit 709. One or more steps of method 200 described above may be performed when the computer program is loaded into RAM 703 and executed by CPU 701.

The embodiments of the present disclosure may further provide a computer-readable storage medium having computer-executable instructions stored thereon, wherein the computer-executable instructions are executed by a processor to implement the method described above. According to an example implementation of the present disclosure, a computer program product is further provided. The computer program product is tangibly stored on a non-transitory computer-readable medium and includes computer-executable instructions. The computer-executable instructions are executed by a processor to implement the method described above.

Various aspects of the present disclosure are described herein with reference to flow charts and/or block diagrams of the method, the apparatus, the device, the computer-readable medium, and the computer program product according to implementations of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or implemented using a combination of special hardware and computer instructions.

As used herein, the term "determine" encompasses a variety of actions. For example, "determine" may include operating, computing, processing, exporting, surveying, looking up (for example, looking up in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

Various implementations of the present disclosure have been described above. The above description is illustrative and not exhaustive, and is not limited to the various implementations disclosed. Numerous modifications and alterations will be apparent to persons of ordinary skill in the art without departing from the scope and spirit of the illustrated implementations. The selection of terms as used herein is intended to best explain the principles and practical applications of the various implementations or improvements to technologies on the market, so as to enable persons of ordinary skill in the art to understand the various implementations disclosed herein.

What is claimed is:

1. A method for graph data processing, comprising:
    obtaining graph data which comprises a plurality of nodes and data corresponding to the plurality of nodes respectively;
    classifying the plurality of nodes into at least one category of a plurality of categories, wherein the plurality of categories are associated with a plurality of node relationship patterns;
    determining, from a plurality of candidate parameter value sets of a graph convolutional network (GCN) model in a processor-based machine learning system, parameter value subsets respectively matching the at least one category, wherein the plurality of candidate parameter value sets are determined by training the GCN model respectively for the plurality of node relationship patterns; and
    using the parameter value subsets respectively matching the at least one category to respectively perform a graph convolution operation in the GCN model of the processor-based machine learning system on data corresponding to the nodes classified into the at least one category to obtain a processing result for the graph data;
    wherein using the parameter value subsets comprises using a first parameter value subset matching a first one of the categories for a first portion of the plurality of nodes to perform a first graph convolution operation in the GCN model, and using a second parameter value subset matching a second one of the categories different than the first one of the categories for a second portion of the plurality of nodes different than the first portion of the plurality of nodes to perform a second graph convolution operation in the GCN model; and
    wherein the method is performed by at least one processing unit comprising a processor coupled to a memory.

2. The method according to claim 1, wherein classifying the plurality of nodes into the at least one category of a plurality of categories comprises:
    determining, based on data corresponding to each of the plurality of nodes, a plurality of correlation scores between each node of the plurality of nodes and the plurality of categories; and
    classifying, based on the plurality of correlation scores between each node of the plurality of nodes and the plurality of categories, each node of the plurality of nodes into at least one category of the plurality of categories.

3. The method according to claim 2, wherein determining the plurality of correlation scores comprises:

obtaining a reference parameter value set, wherein a plurality of reference parameter value subsets in the reference parameter value set are associated with the plurality of categories; and determining, for each node of the plurality of nodes, the plurality of correlation scores between the node and the plurality of categories based on data corresponding to the node and the plurality of reference parameter value subsets.

4. The method according to claim 3, wherein determining the plurality of correlation scores between the node and the plurality of categories based on data corresponding to the node and the plurality of reference parameter value subsets comprises:

constructing an attention model which takes the reference parameter value sets as model parameters; and applying data corresponding to each node of the plurality of nodes to the attention model to obtain the plurality of correlation scores output by the attention model.

5. The method according to claim 2, wherein classifying, based on the plurality of correlation scores between each node of the plurality of nodes and the plurality of categories, each node of the plurality of nodes into at least one category of the plurality of categories comprises: for each node of the plurality of nodes, selecting a correlation score exceeding a score threshold from a plurality of correlation scores determined for the node; and classifying the node into a category of the plurality of categories that corresponds to the selected correlation score.

6. The method according to claim 1, wherein determining parameter value subsets respectively matching the at least one category comprises:

determining, based on an association relationship between the plurality of node relationship patterns and the plurality of candidate parameter value sets, a matching candidate parameter value set for each category in the at least one category from the plurality of candidate parameter value sets; and determining, for each category in the at least one category and based on a matching candidate parameter value set for the category and nodes classified into the category, a parameter value subset corresponding to the category from the matching candidate parameter value set.

7. An electronic device, comprising:

at least one processing unit; and at least one memory coupled to the at least one processing unit and storing instructions for execution by the at least one processing unit, wherein the instructions, when executed by the at least one processing unit, cause the device to perform actions comprising:

obtaining graph data which comprises a plurality of nodes and data corresponding to the plurality of nodes respectively;

classifying the plurality of nodes into at least one category of a plurality of categories, wherein the plurality of categories are associated with a plurality of node relationship patterns;

determining, from a plurality of candidate parameter value sets of a graph convolutional network (GCN) model in a processor-based machine learning system, parameter value subsets respectively matching the at least one category, wherein the plurality of candidate parameter value sets are determined by training the GCN model respectively for the plurality of node relationship patterns; and using the parameter value subsets respectively matching the at least one category to respectively perform a graph convolution operation in the GCN model of the processor-based machine learning system on data corresponding to the nodes classified into the at least one category to obtain a processing result for the graph data;

wherein using the parameter value subsets comprises using a first parameter value subset matching a first one of the categories for a first portion of the plurality of nodes to perform a first graph convolution operation in the GCN model, and using a second parameter value subset matching a second one of the categories different than the first one of the categories for a second portion of the plurality of nodes different than the first portion of the plurality of nodes to perform a second graph convolution operation in the GCN model.

8. The device according to claim 7, wherein classifying the plurality of nodes into the at least one category of a plurality of categories comprises:

determining, based on data corresponding to each of the plurality of nodes, a plurality of correlation scores between each node of the plurality of nodes and the plurality of categories; and classifying, based on the plurality of correlation scores between each node of the plurality of nodes and the plurality of categories, each node of the plurality of nodes into at least one category of the plurality of categories.

9. The device according to claim 8, wherein determining the plurality of correlation scores comprises:

obtaining a reference parameter value set, wherein a plurality of reference parameter value subsets in the reference parameter value set are associated with the plurality of categories; and determining, for each node of the plurality of nodes, the plurality of correlation scores between the node and the plurality of categories based on data corresponding to the node and the plurality of reference parameter value subsets.

10. The device according to claim 9, wherein determining the plurality of correlation scores between the node and the plurality of categories based on data corresponding to the node and the plurality of reference parameter value subsets comprises:

constructing an attention model which takes the reference parameter value sets as model parameters; and applying data corresponding to each node of the plurality of nodes to the attention model to obtain the plurality of correlation scores output by the attention model.

11. The device according to claim 8, wherein classifying, based on the plurality of correlation scores between each node of the plurality of nodes and the plurality of categories, each node of the plurality of nodes into at least one category of the plurality of categories comprises: for each node of the plurality of nodes, selecting a correlation score exceeding a score threshold from a plurality of correlation scores determined for the node; and classifying the node into a category of the plurality of categories that corresponds to the selected correlation score.

12. The device according to claim 7, wherein determining parameter value subsets respectively corresponding to the at least one category comprises:

determining, based on an association relationship between the plurality of node relationship patterns and the plurality of candidate parameter value sets, a matching candidate parameter value set for each category in the at least one category from the plurality of candidate parameter value sets; and determining, for each category in the at least one category and based on a matching candidate parameter value set for the category and nodes classified into the category, a parameter value subset corresponding to the category from the matching candidate parameter value set.

13. A computer program product tangibly stored on a non-transitory computer-readable medium and comprising computer-executable instructions, wherein the computer-executable instructions, when executed, cause a device to perform actions comprising:

obtaining graph data which comprises a plurality of nodes and data corresponding to the plurality of nodes respectively;

classifying the plurality of nodes into at least one category of a plurality of categories, wherein the plurality of categories are associated with a plurality of node relationship patterns;

determining, from a plurality of candidate parameter value sets of a graph convolutional network (GCN) model in a processor-based machine learning system, parameter value subsets respectively matching the at least one category, wherein the plurality of candidate parameter value sets are determined by training the GCN model respectively for the plurality of node relationship patterns; and using the parameter value subsets respectively matching the at least one category to respectively perform a graph convolution operation in the GCN model of the processor-based machine learning system on data corresponding to the nodes classified into the at least one category to obtain a processing result for the graph data;

wherein using the parameter value subsets comprises using a first parameter value subset matching a first one of the categories for a first portion of the plurality of nodes to perform a first graph convolution operation in the GCN model, and using a second parameter value subset matching a second one of the categories different than the first one of the categories for a second portion of the plurality of nodes different than the first portion of the plurality of nodes to perform a second graph convolution operation in the GCN model.

14. The computer program product according to claim 13, wherein classifying the plurality of nodes into the at least one category of a plurality of categories comprises:

determining, based on data corresponding to each of the plurality of nodes, a plurality of correlation scores between each node of the plurality of nodes and the plurality of categories; and classifying, based on the plurality of correlation scores between each node of the plurality of nodes and the plurality of categories, each node of the plurality of nodes into at least one category of the plurality of categories.

15. The computer program product according to claim 14, wherein determining the plurality of correlation scores comprises:

obtaining a reference parameter value set, wherein a plurality of reference parameter value subsets in the reference parameter value set are associated with the plurality of categories; and determining, for each node of the plurality of nodes, the plurality of correlation scores between the node and the plurality of categories based on data corresponding to the node and the plurality of reference parameter value subsets.

16. The computer program product according to claim 15, wherein determining the plurality of correlation scores between the node and the plurality of categories based on data corresponding to the node and the plurality of reference parameter value subsets comprises:

constructing an attention model which takes the reference parameter value sets as model parameters; and applying data corresponding to each node of the plurality of nodes to the attention model to obtain the plurality of correlation scores output by the attention model.

17. The computer program product according to claim 14, wherein classifying, based on the plurality of correlation scores between each node of the plurality of nodes and the plurality of categories, each node of the plurality of nodes into at least one category of the plurality of categories comprises: for each node of the plurality of nodes, selecting a correlation score exceeding a score threshold from a plurality of correlation scores determined for the node; and classifying the node into a category of the plurality of categories that corresponds to the selected correlation score.

18. The computer program product according to claim 13, wherein determining parameter value subsets respectively corresponding to the at least one category comprises:

determining, based on an association relationship between the plurality of node relationship patterns and the plurality of candidate parameter value sets, a matching candidate parameter value set for each category in the at least one category from the plurality of candidate parameter value sets; and determining, for each category in the at least one category and based on a matching candidate parameter value set for the category and nodes classified into the category, a parameter value subset corresponding to the category from the matching candidate parameter value set.

19. The computer program product according to claim 13, wherein obtaining graph data which comprises a plurality of nodes and data corresponding to the plurality of nodes respectively comprises obtaining at least portions of the data corresponding to the plurality of nodes from respective ones of a plurality of sensors.

20. The computer program product according to claim 19, wherein the portions of the data corresponding to the plurality of nodes comprise traffic flow data collected using the sensors.

* * * * *